May 26, 1931.  A. H. STEBBINS  1,807,451
ANTIFRICTION BEARING
Filed May 24, 1929
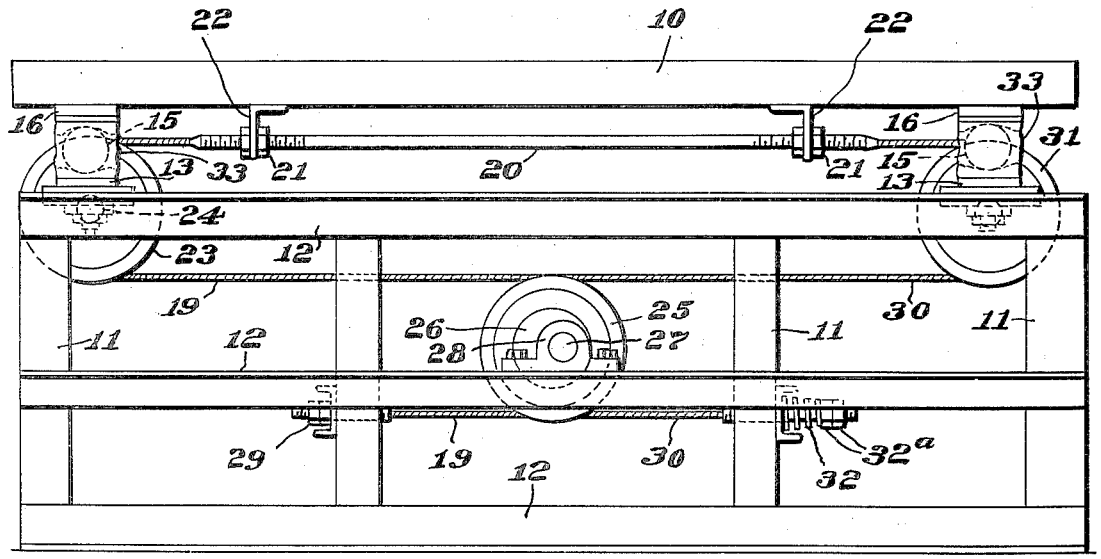
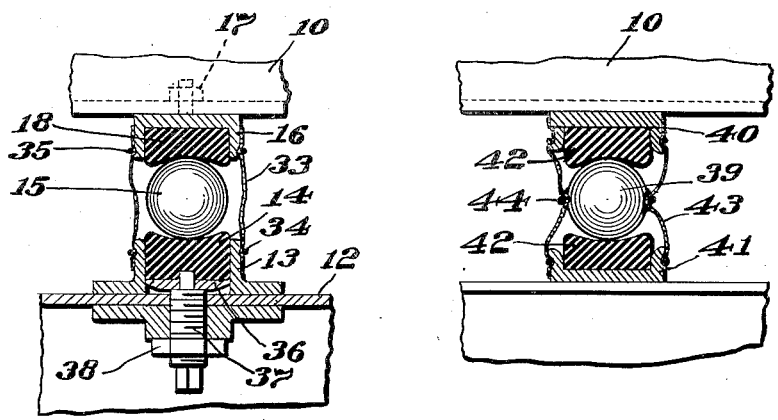
INVENTOR:
Albert H. Stebbins
BY Robt. P. Harris
ATTORNEY Patented May 26, 1931

1,807,451

UNITED STATES PATENT OFFICE

ALBERT H. STEBBINS, OF LOS ANGELES, CALIFORNIA

ANTIFRICTION BEARING

Application filed May 24, 1929. Serial No. 365,749.

This invention relates to antifriction bearings for supporting frames for shifting or vibratory movement.

Vibratory frames are extensively used to sift, grade and otherwise separate comminuted materials. The vibratory movement imparted to the material supporting frames usually has a short, energetic stroke that causes practically the entire wear upon the supporting bearings to be confined to a small area of the cooperating elements with the result that these active surfaces wear out rapidly.

Furthermore, the dirt and dust produced by the separating operations tends to lodge upon the frame supporting bearings with injurious effect.

The present invention therefore relates to a novel form of antifriction bearing which may be employed for various purposes but is particularly well adapted to support a vibratory frame for vibratory movement.

One of the features of the present invention resides in a construction in which the antifriction ball or roller of the bearing rests upon a bearing plate formed of non-metallic, compressible material such as rubber. As a result of this construction, shocks and jars which are transmitted to the ball or roller are absorbed by the yielding supporting plate, and the antifriction bearing operates in a silent and efficient manner.

Another feature of the invention resides in a flexible sleeve adapted to enclose the cooperating parts of the antifriction bearing to exclude dirt and dust from the bearing surfaces.

Still another feature of the invention resides in the construction whereby the central part of the dirt excluding sleeve is connected to the antifriction ball and helps to hold the ball centered upon its supporting plate.

Other features of the invention and novel combination of parts in addition to the above will be hereinafter described in connection with the accompanying drawings which illustrate good practical forms of the invention.

In the drawings,—

Fig. 1 is a side elevation of a frame supported by antifriction bearings constructed in accordance with the present invention;

Fig. 2 is a vertical sectional view through one of the antifriction bearings of Fig. 1; and Fig. 3 is a vertical sectional view through a modified type of antifriction bearing.

Antifriction bearings forming the subject matter of the present invention may be used for various purposes, but are peculiarly well adapted for use to support vibratory frames such as may be employed in screening, concentrating or otherwise separating ores or other comminuted materials. The antifriction bearings of the present invention are therefore shown in the drawings as employed to support a vibratory frame 10 which is mounted upon the supporting casing having the uprights 11 that are secured to the longitudinally extending beams 12.

The vibratory frame 10 is supported upon the fixed casing by a suitable number of antifriction bearings, four of these antifriction bearings being usually employed, one for supporting each corner of the frame 10 so that the frame may partake of a limited vibratory movement.

In accordance with the present invention each antifriction bearing consists of a lower cup or annular sleeve 13 which is secured upon the upper face of the channel iron or top rail 12 and within this cup 13 is mounted a pad or floor plate 14 which, in accordance with the present invention, is constructed of non-metallic, compressible material such as rubber. The resilient or compressible pad 14 is adapted to support an antifriction ball or roller 15 and this ball or roller serves to support the upper bearing cup 16 that is rigidly secured to the frame 10 by a bolt or the like 17.

The upper cup 16 preferably has mounted therein a pad or bearing surface 18 which may be constructed of the same material as the floor plate or pad 14. The construction is such that the pads 14 and 18 with which the ball or roller 15 contacts will support the frame 10 for free vibratory movement, but at the same time will absorb the shocks and jars to which the antifriction bearing may be subjected. The antifriction ball or roller 15 may be formed of various materials such, for example, as metal, wood or hard rubber.

Any suitable means may be employed for imparting the desired vibratory movement to the frame 10, but in most cases it is found desirable to move the frame 10 back and forth through a relatively short range or stroke. The antifriction bearing shown is therefore constructed to support the frame 10 for vibratory movement through only a short stroke.

One simple form of means for imparting a vibratory movement to the frame 10 is illustrated in the drawing and consists of operating cables, one of these cables has its upper end secured to a rod 20 which is adjustably secured by means of nuts 21 to brackets 22 that are fastened to the under face of the frame 10. The upper end portion of the cable 19 is looped about a grooved idle sheave 23 having a shaft 24 mounted upon the supporting structure. The cable 19 extends from the under face of the sheave 23 about the grooved sheave 25 which is journaled upon an eccentric 26, and this eccentric is rigidly secured to a power shaft 27 that is journaled in the supporting brackets 28. The power shaft 27 may be rotated by any suitable means not shown. The lower end portion of the cable 19 is anchored to the supporting structure by adjustable nuts or the like 29.

The arrangement just described is such that when the shaft 27 is driven its eccentric 26 will move the grooved sheave 25 in an orbital path and this will serve alternately to tension and slack off the cable 19 to thereby rapidly pull the frame 10 in a left-hand direction. The frame 10 is pulled in a right-hand direction by the cable 30 the upper portion of which passes around the idle sheave 31 and is secured to the rod 20 while an intermediate portion of this cable passes about a second groove formed around the eccentric actuated sheave 25 and the lower end of the cable 30 is yieldingly secured to the supporting structure by a spring 32 and the adjustable nuts 32a. It will be apparent from the operating mechanism just described that when the eccentric 26 is rotated it will actuate the sheave 25 to alternately tension and slack off the cables 19 and 30 to thereby pull the vibratory frame back and forth.

The vibratory movement imparted to the materials being treated frequently produces considerable dirt and dust which is more or less injurious to the frame supporting bearings. It is therefore desirable to prevent this dirt and dust from reaching the active surfaces of the antifriction bearings employed to support the frame 10, and this is accomplished, in accordance with the present invention, by providing each antifriction bearing with a flexible sleeve 33 which may be formed of sheet rubber or other material that is more or less impervious to dirt and dust. The lower end of this sleeve 33 is secured to the lower cut 13 by a binding cord or band 34 and the upper end of the sleeve is secured to the upper cup 16 by a binding cord or band 35. The sleeve 33 when arranged as just described will exclude dirt and dust from the antifriction bearings without interfering with the movement of the operating parts.

In some cases it may be desirable to raise and lower the ball supporting floor plate 14 to vary the load or weight of the frame 10 which is supported by a particular ball bearing, and this is accomplished in the construction shown by mounting the pad 14 in its cup 13 for vertical sliding movement and by providing this cup 13 with a pad supporting washer or disk 36 adapted to be raised or lowered by operating its supporting bolt 37 which may be clamped in the desired position of adjustment by tightening the lock nut 38.

In some constructions the vibratory frame is supported at an inclination in the direction of its length by the antifriction bearings, and as a result the vibratory frame and antifriction balls or rollers will tend to move in a downhill direction under the influence of gravity; this tendency of the balls to move towards the lower side of their supporting cups is objectionable, and another feature of the present invention resides in the modified construction shown in Fig. 3 wherein means is provided for yieldingly retaining the antifriction ball 39 properly centered within the upper and lower cups 40 and 41 respectively. Each of these cups may be provided with a resilient or yielding ball engaging pad 42 which may be similar to the pads 14 and 18 above described. The antifriction bearing shown in Fig. 3 is provided with a flexible sleeve 43 which is preferably formed of rubber and is adapted to exclude dirt and dust from the bearing surfaces like the sleeve 33 above described, and the opposite ends of this sleeve 43 are secured to the cups 41 and 40 as shown.

In order to maintain the ball 39 in its central position within its supporting cup 41 this ball is provided with an annular groove to which the central portion of the flexible sleeve 43 is secured by a band or ring 44, the construction being such that the central portion of the sleeve 43 is tightly secured to the ball 39 and any movement of this ball from its central position within the cups 40, 41 will tension a portion of the sleeve 43 so that the latter will tend to return the ball to its central position in which it is shown in Fig. 3.

It will be apparent from the foregoing that since the antifriction ball or roller is mounted between a pair of relatively soft flexible pads the ball or roller will be subjected to a minimum amount of wear and will be protected by these pads from injurious shocks and jars. It will also be apparent that this type of bearing does not require a lubricant and that dirt and dust are excluded from the operating parts in a simple but satisfactory manner. All of these features tend to increase the life of the antifriction bearing of the present invention and cause it to operate smoothly and silently.

The ball engaging faces of the pads 14 and 18 are preferably given the concave construction shown, to center the ball within the cups, and the same is true of the pads 42 shown in Fig. 3.

What is claimed is:—

1. In combination with a supporting casing, a frame, and antifriction means for supporting the frame upon the casing for vibratory movement, comprising bearing cups, antifriction annular members mounted in the cups for rolling movement to support said frame, and a floor of non-metallic compressible material mounted in a cup of each bearing to form a yielding shock absorbing bearing seat for the annular member.

2. In combination with a supporting casing, a frame, and antifriction means for supporting the frame upon the casing, for vibratory movement, comprising upper and lower bearing cups, an antifricton ball mounted in each pair of cups, and an elastic sleeve having its ends secured to the upper and lower cups respectively of a pair of cups and having its intermediate portion secured to said ball to restrain the movement of the ball.

3. In combination with a supporting casing, a frame, and antifriction means for supporting the frame upon the casing, for vibratory movement, comprising upper and lower bearing cups, an antifriction ball mounted in each pair of cups and provided with a central groove, and a sleeve having its ends secured to the upper and lower cups respectively of a pair of cups and having its intermediate portion secured in said groove to restrain the movement of the ball.

4. In combination with a supporting casing, a frame, and antifriction means for supporting the frame upon the casing for vibratory movement, comprising upper and lower bearing cups, an antifriction ball mounted in each lower cup to support the upper cup, and a flexible sleeve having its ends secured to the upper and lower cups respectively of a pair of cups to exclude dirt and dust from the ball.

5. In combination with a supporting casing, a frame, and antifriction means for supporting the frame upon the casing for vibratory movement, comprising upper and lower bearing cups, an antifriction annular member mounted in each lower cup for rolling movement to support the upper cup, and a flexible sleeve having its ends secured to the upper and lower cups respectively of a pair of cups to exclude dirt and dust from said annular member.

In testimony whereof, I have signed my name to this specification.

ALBERT H. STEBBINS.